No. 644,853. Patented Mar. 6, 1900.
E. FAHL.
MOTOR VEHICLE.
(Application filed July 3, 1899.)
(No Model.)

Attest:
M. T. Smith
Maude Griffin

Inventor
Eugene Fahl
By Higdon & Longan Atty's

THE NORRIS PETERS CO., PHOTO-LITHO., WASHINGTON, D. C.

United States Patent Office.

EUGENE FAHL, OF ST. LOUIS, MISSOURI.

MOTOR-VEHICLE.

SPECIFICATION forming part of Letters Patent No. 644,853, dated March 6, 1900.

Application filed July 3, 1899. Serial No. 722,742. (No model.)

*To all whom it may concern:*

Be it known that I, EUGENE FAHL, of the city of St. Louis, State of Missouri, have invented certain new and useful Improvements in Motor-Vehicles, of which the following is a full, clear, and exact description, reference being had to the accompanying drawings, forming a part hereof.

My invention relates to motor-vehicles; and it consists of the novel construction, combination, and arrangement of parts hereinafter described and claimed.

Figure 1:
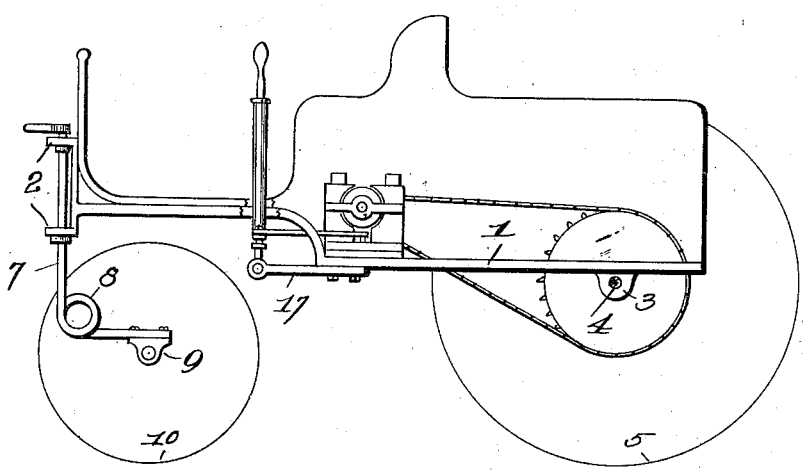
Figure 2:
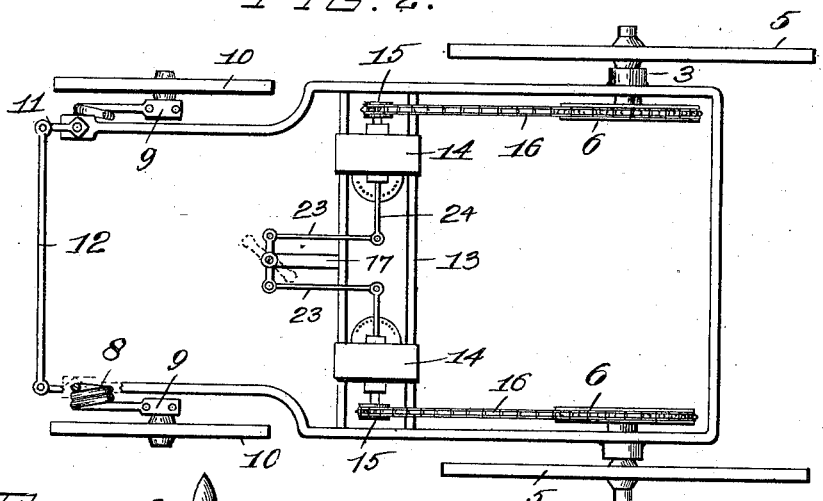
Figure 3:
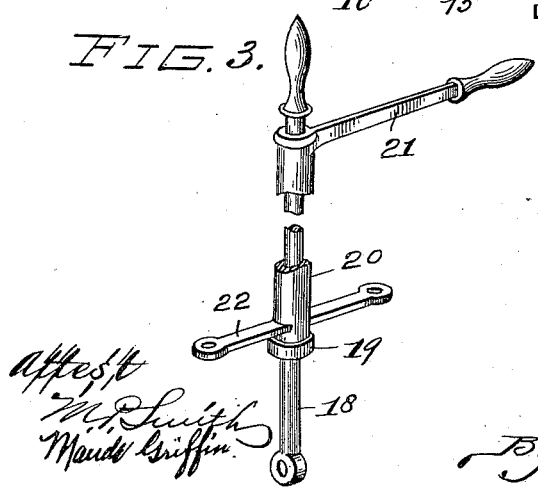
Figure 4:
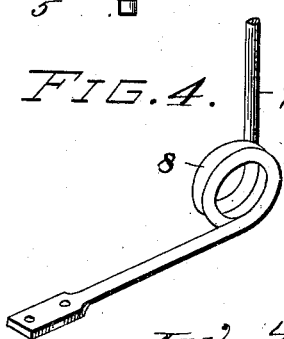

Figure 1 is a side elevation of a motor-vehicle of my improved construction. Fig. 2 is a plan view of the framework and gearing thereof. Fig. 3 is a view in perspective of the steering and controlling levers of my improved vehicle. Fig. 4 is a view in perspective of one of the springs made use of in my improved vehicle.

In the construction of my improved vehicle a rectangularly-bent frame 1 is made use of, the forward portion of which frame is slightly higher and narrower than the rear portion, and the forward ends of said frame are each provided with a pair of vertically-arranged bearings 2. Formed in the rear end of the sides of the frame 1 are the oppositely-arranged bearings 3, in each of which operates a short shaft 4, which shafts together perform the function of the rear axle of the vehicle, and on the outer ends of said shafts are arranged the rear wheels 5 of the vehicle, there being large gear-wheels 6 fixed upon the inner ends of said shafts.

Rotatably arranged in the vertical bearings 2 are shafts 7, integral with the lower portions of which are formed coil-springs 8, and the ends of said coil-springs are extended rearwardly a short distance, and journal-bearings 9 are secured to said rearwardly-bent ends. In said journal-boxes 9 are rotatably arranged the stub-axles on which the front wheels 10 of the vehicle are arranged. Short crank-bars 11 are rigidly fixed upon the upper ends of the shafts 7, which crank-bars extend forwardly, and their ends are connected by the cross-bar 12, thus providing means for causing the shafts 7 and front wheels to move simultaneously.

Mounted upon the cross-bars 13 in the frame 1, adjacent each side thereof, is a motor 14, upon the shaft of each of which motors is fixed a small pinion 15, there being a sprocket-chain 16 passing around each of said pinions 15 and from thence to the gear-wheels 6.

Fulcrumed to a bracket 17 at the center of the frame 1 is the lower end of a vertically-positioned operating-handle 18, the same extending upwardly through the vehicle, and upon said handle, a short distance from the lower end thereof, is fixed a collar 19. This operating-handle extends upwardly just in front of the seat of the vehicle, and rotatably arranged upon the upper portion of said handle above the collar 19 is a sleeve 20, there being an operating-handle 21 projecting laterally from the upper end of said sleeve.

Fixed to and projecting laterally from each side of the lower end of the sleeve 20 are the arms 22, to the outer ends of which are pivotally connected the rods 23, which extend rearwardly a short distance and are pivotally connected to the rheostat-arms 24 of the motors 14. The storage batteries used for operating the motors of my improved vehicle may be conveniently located in the rear portion of the body thereof upon the frame 1.

When the vehicle is in use or to start the same, the operator pushes forwardly on the upper end of the operating-handle 18 and in so doing draws the connecting-rods 23 forwardly, thereby actuating the rheostat-arms of the motor. The motors being thus started will rotate in the usual manner, and as a result thereof the gear-wheels 6 will be rotated to drive the rear wheels of the vehicle forwardly. As the motors operate at the same speed, the rear wheels will be driven forwardly at the same speed, and consequently the vehicle will travel forwardly in a straight line.

When it is desired to turn the vehicle, the operator engages the handle 21 and moves the same forwardly or rearwardly, corresponding to the direction in which it is desired to turn, and this movement rotates the sleeve 20 upon the operating-handle 18, and the arms 22, carried by said sleeve 20, will be thrown into an angular position relative to the transverse position usually occupied by said arms, and this movement necessarily brings one of the rheostat-arms forwardly and moves the opposite arm rearwardly, thus increasing the speed of one motor and proportionately decreasing the speed of the opposite motor. Thus one of the rear wheels of the vehicle will be driven at a greater speed than the opposite wheel and said vehicle will be turned. When the vehicle is running, the front wheels thereof act as caster-wheels and will correspondingly follow all the movements of the rear wheels of said vehicle, and owing to the location of the springs S in the shafts that carry the front wheels the front portion of the vehicle will ride easily and there will be no great shock or vibration as said wheels pass over a rough portion of the road.

In a motor-vehicle of my improved construction the steering is all done with the rear wheels, and as but a single operating-handle is made use of said vehicle can be very easily controlled.

I claim—

In a motor-vehicle, a frame, suitable traction-wheels on which said frame is arranged, means carried by the frame for driving the rear pair of wheels, a pair of vertically-arranged shafts journaled in the forward portion of the frame, springs integral with the lower ends of said shafts, the ends of which springs are bent rearwardly, and journal-boxes secured to said rearwardly-bent ends in which the stub-axles of the front wheels operate, substantially as specified.

In testimony whereof I affix my signature in presence of two witnesses.

EUGENE FAHL.

Witnesses:
EDWARD E. LONGAN,
M. P. SMITH.